(12) United States Patent
Sun et al.

(10) Patent No.: US 11,337,224 B2
(45) Date of Patent: May 17, 2022

(54) ELECTRONIC DEVICE, METHOD AND COMPUTER READABLE STORAGE MEDIUM FOR RE-ALLOCATION OF WIRELESS COMMUNICATION RESOURCES

(71) Applicants: Sony Corporation, Tokyo (JP); Chen Sun, Beijing (CN)

(72) Inventors: Chen Sun, Beijing (CN); Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 28 days.

(21) Appl. No.: 16/962,868

(22) PCT Filed: Mar. 5, 2019

(86) PCT No.: PCT/CN2019/076932
§ 371 (c)(1),
(2) Date: Jul. 17, 2020

(87) PCT Pub. No.: WO2019/170071
PCT Pub. Date: Sep. 12, 2019

(65) Prior Publication Data
US 2020/0351899 A1 Nov. 5, 2020

(30) Foreign Application Priority Data

Mar. 9, 2018 (CN) .......................... 201810195374.1

(51) Int. Cl.
*H04W 72/08* (2009.01)
*H04W 48/16* (2009.01)

(52) U.S. Cl.
CPC ......... *H04W 72/082* (2013.01); *H04W 48/16* (2013.01)

(58) Field of Classification Search
CPC ... H04W 16/14; H04W 52/242; H04W 24/08; H04W 72/082; H04W 72/0453; H04W 16/18; H04W 24/02; H04W 48/16; H04W 4/029; H04W 52/243; H04W 84/18; H04W 16/10; H04W 40/20; H04W
(Continued)

(56) References Cited

U.S. PATENT DOCUMENTS

| 2008/0198798 A1* | 8/2008 | Wu ....................... H04W 16/02 370/328 |
| 2012/0122467 A1* | 5/2012 | Auer ..................... H04W 16/10 455/452.1 |
| 2017/0311167 A1* | 10/2017 | Sun ..................... H04W 60/005 |

FOREIGN PATENT DOCUMENTS

| CN | 102170706 A | 8/2011 |
| CN | 103796211 A | 5/2014 |

(Continued)

OTHER PUBLICATIONS

"Advance in Adaptive Modulation for Fading Channels" by Hamamreh et al., dated May 2015 (Year: 2015).*
(Continued)

*Primary Examiner* — Daniel Lai
(74) *Attorney, Agent, or Firm* — Xsensus LLP

(57) ABSTRACT

The present application provides an electronic device, method, and computer readable storage medium for wireless communication. The electronic device comprises a processing circuit, the processing circuit being configured to: determine a distribution state of nodes in a management region of a spectrum management device; on the basis of the distribution state, obtain a distribution model showing cumulative interference received by a specific node of said nodes from other nodes of said nodes; and on the basis of the distribution model and a maximum allowable interference for the specific node, determine an exclusive region for the specific node, wherein the exclusive region is represented by the number of nodes in the exclusive region.

18 Claims, 9 Drawing Sheets

(58) Field of Classification Search
CPC .. 4/021; H04W 52/367; H04W 16/04; H04W 16/22; H04W 28/0268; H04W 28/16; H04W 36/0061; H04W 36/00835; H04W 40/16; H04W 48/02; H04W 48/04; H04W 4/025; H04W 4/40; H04W 4/46; H04W 4/50; H04W 4/90; H04W 52/386; H04W 72/04; H04W 72/0446; H04W 72/046; H04W 72/048; H04W 72/12; H04W 72/1226; H04W 72/1231; H04W 72/1242; H04W 24/10; H04B 17/345; H04B 17/318; H04B 17/391; H04B 7/204; H04J 14/02
See application file for complete search history.

(56) References Cited

FOREIGN PATENT DOCUMENTS

| | | | |
|---|---|---|---|
| CN | 104010288 A | 8/2014 | |
| CN | 105578474 A | 5/2016 | |
| WO | WO-2016062172 A1 * | 4/2016 | ............ H04W 24/02 |

OTHER PUBLICATIONS

"3.5 GHz Exclusion Zone Analyses and Methodology" by Drocella et al., dated Mar. 2016 (Year: 2016).*
"Interference Modeling for Wireless Ad Hoc Networks" by Lima-e-Lima et al., dated 2010 (Year: 2010).*
International Search Report and Written Opinion dated May 28, 2019 for PCT/CN2019/076932 filed on Mar. 5, 2019, 8 pages including English Translation of the International Search Report.
Bhattarai Sudeep et al: "TESSO: An analytical tool for characterizing aggregate interference and enabling spatial spectrum sharing", 2017 IEEE International Symposium on Dynamic Spectrum Access Networks (DYSPAN),IEEE,Mar. 6, 2017 (Mar. 6, 2017), pp. 1-10, XP033094071, DOI: 10.1109/DYSPAN.2017.7920793[retrieved on May 5, 2017]* p. 1-p. 3 *.
Ali Mohd Shabbir et al: "Modeling time-varying aggregate interference from cognitive radios and implications on primary exclusive zone design", 2013 IEEE Global Communications Conference (Globecom), IEEE, Dec. 9, 2013 (Dec. 9, 2013), pp. 3760-3765, XP032604744, DOI: 10.1109/GLOCOM. 2013. 6831658 [retrieved on Jun. 11, 2014] * the whole document*.

* cited by examiner

ELECTRONIC DEVICE, METHOD AND COMPUTER READABLE STORAGE MEDIUM FOR RE-ALLOCATION OF WIRELESS COMMUNICATION RESOURCES

CROSS-REFERENCE TO RELATED APPLICATIONS

The present application is based on PCT filing PCT/CN2019/076932, filed Mar. 05, 2019, which claims priority to Chinese Patent Application No. 201810195374.1, filed Mar. 9, 2018 with the China National Intellectual Property Administration (CNIPA), each of which is incorporated herein by reference in its entirety.

FIELD

Embodiments of the present application generally relate to the field of wireless communications, in particular to a spectrum allocation technology, and in more particular to an electronic apparatus and a method for wireless communications and a computer readable storage medium.

BACKGROUND

With the development of the wireless communication technology, users have increasingly high requirements on high quality, high speed new services. Wireless communications operators and device operators are required to continuously improve the system to meet the requirements of the users. A great amount of spectrum resources are required to support new services emerging continuously and meet requirements of high speed communications. The spectrum resource may be quantified by using parameters such as time, frequency, bandwidth and allowable maximum emission power.

Presently, limited spectrum resources have been allocated to fixed operators and services, and new available spectrums are rare or expensive. In this case, a concept of dynamic spectrum utilization is put forward. That is, spectrum resources that have been allocated to certain services but are not fully utilized are dynamically utilized.

For example, spectrums of a channel on which no program is played or spectrums of an adjacent channel among digital television broadcast spectrums are dynamically utilized, to perform wireless mobile communications without interfering receiving of a television signal. In this example, the television broadcast spectrum is allocated to the television broadcast system for use, so the television broadcast system is a primary system and the television is a primary user. Accordingly, the mobile communication system is a secondary system, and a receiver in the mobile communication system is a secondary user. Here, the primary system may refer to a system having spectrum usage right, for example the television broadcast system. The secondary system refers to a system having no spectrum usage right, which only appropriately uses the spectrum of the primary system when the primary system does not use the spectrum. In addition, both the primary system and the secondary system may have the spectrum usage right, but they have different priority levels in using the spectrum. For example, when the operator deploys a new base station to provide a new service, the existing base station and the provided service have priority in using the spectrum.

The primary system consists of a primary user base station and a primary user. The secondary system consists of a secondary user base station and a secondary user. Communication between the secondary user base station and one or more secondary users, or communication between multiple secondary users forms a secondary system.

Such a communication manner of the primary system and the secondary system coexisting requires that the applications of the secondary system do not produce negative impact on the applications of the primary system, or the impact produced by the spectrum utilization of the secondary system can be controlled in an allowable range of the primary system. For example, in a case that there are multiple secondary systems, accumulated interferences of the secondary systems cannot go beyond the allowable interference range of the primary system.

In addition, other frequency bands, such as 3.5 GHz authorized to a radar system, can also be dynamically utilized.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The electronic apparatus includes processing circuitry, configured to: determine a distribution status of nodes within a management region of a spectrum management apparatus; acquire, based on the distribution status, a distribution model of accumulated interferences for a particular node among the nodes subjected from other nodes among the nodes; and determine, based on the distribution model and an allowable interference upper limit of the particular node, an exclusion zone of the particular node which is represented by the number of nodes within the exclusion zone.

According to another aspect of the present disclosure, a method for wireless communications is provided. The method includes: determining a distribution status of nodes within a management region of a spectrum management apparatus; acquiring, based on the distribution status, a distribution model of accumulated interferences for a particular node among the nodes subjected from other nodes among the nodes; and determining, based on the distribution model and an allowable interference upper limit of the particular node, an exclusion zone of the particular node which is represented by the number of nodes within the exclusion zone.

According to the electronic apparatus and the method described above, the exclusion zone of the particular node represented by discrete values can be determined according to the distribution model of the accumulated interferences, thereby obtaining a stable exclusion zone, improving system stability and improving spectrum utilization efficiency.

According to another aspect of the present disclosure, an electronic apparatus for wireless communications is provided. The electronic apparatus includes processing circuitry configured to: determine, by ranking neighboring nodes of each node in an order from near to far, neighboring relationship between nodes; judge whether the neighboring relationship changes; and in a case that the neighboring relationship changes, re-allocate spectrum resources for the nodes based on changed neighboring relationship.

According to another aspect of the present disclosure, a method for wireless communications is provided. The method includes: determining, by ranking neighboring nodes of each node in an order from near to far, neighboring relationship between nodes; judging whether the neighboring relationship changes; and in a case that the neighboring relationship changes, re-allocating spectrum resources for the nodes based on changed neighboring relationship.

According to the electronic apparatus and the method described above, the spectrum resources can be allocated in response to change of the neighboring relationship, thereby reducing system overhead and improving spectrum utilization efficiency.

According to other aspects of the present disclosure, there are further provided computer program codes and computer program products for implementing the methods for wireless communications above, and a computer readable storage medium having recorded thereon the computer program codes for implementing the methods for wireless communications described above.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings.

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

Figure 1:
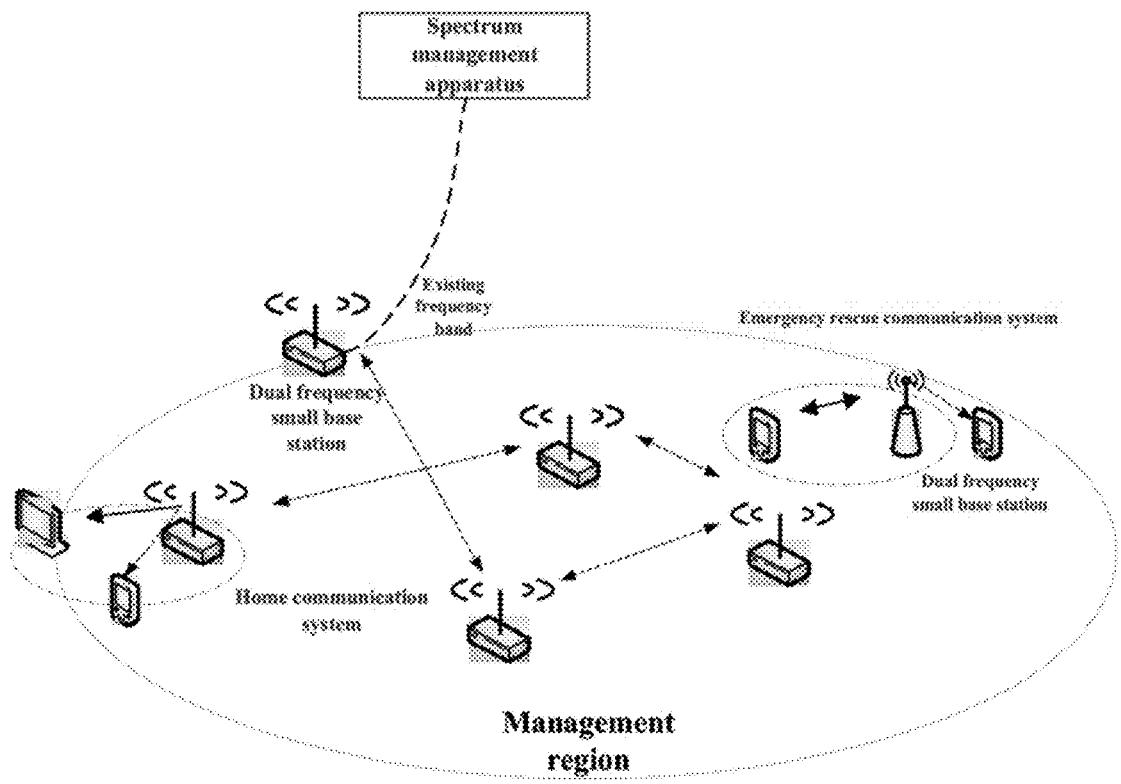
FIG. 1 shows an example of a system scenario.

As described above, an impact on usage of spectrum resources of a primary system due to a secondary system should be controlled, so that the impact is within an allowable range of the primary system. For example, an exclusion zone (also referred to as a protection zone) may be arranged around the primary system, that is, a secondary system in the exclusion zone is not allowed to use the same spectrum resources as the primary system. In addition to the primary system, an exclusion zone may also be arranged for a secondary system with a high priority level, thereby ensuring usage of spectrum by the secondary system, that is, ensuring an expected communication quality or spectrum usage efficiency of the secondary system or the like. For example, as shown in FIG. 1, there are many LTE multimode small base stations in a management range of a spectrum management apparatus. The small base stations may simultaneously use the existing LTE frequency bands and new frequency bands such as 3.5 GHz. The small base stations provide wireless access network service for example home wireless network, by using the existing LTE frequency band. In addition, extra spectrum resources such as 3.5 GHz frequency bands may be used as required to increase a system bandwidth so as to provide extra service, such as television video transmission. In a case that an emergency occurs, a certain small base station provides sufficient bandwidth for rescue teams for video transmission. In this case, the small base station has a high priority level for spectrum usage, and an exclusion zone may be provided for the small base station to ensure its spectrum usage efficiency.

Figure 2:
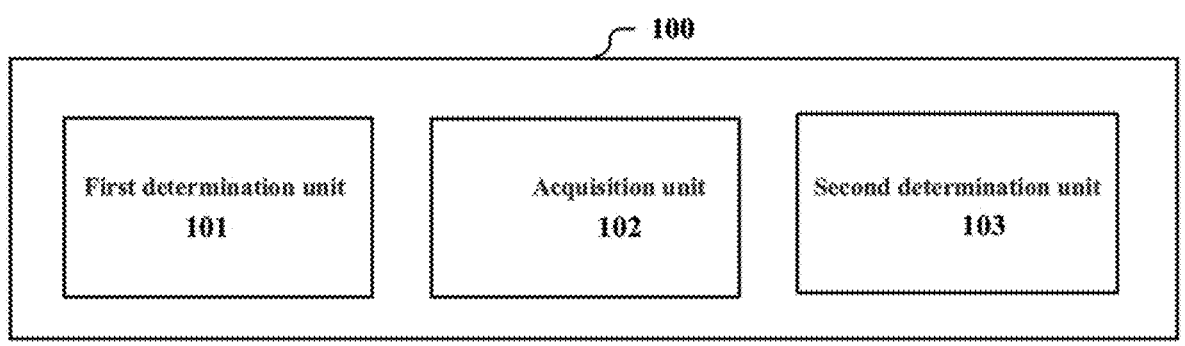
FIG. 2 shows a block diagram of functional modules of an electronic apparatus for wireless communications according to an embodiment of the present disclosure.

FIG. 2 shows a block diagram of functional modules of an electronic apparatus 100 for wireless communications according to an embodiment of the present disclosure. As shown in FIG. 2, the electronic apparatus 100 includes a first determination unit 101, an acquisition unit 102 and a second determination unit 102. The first determination unit 101 is configured to determine a distribution status of nodes within a management region of a spectrum management apparatus. The acquisition unit 102 is configured to acquire, based on the distribution status, a distribution model of accumulated interferences for a particular node among the nodes subjected from other nodes among the nodes. The second determination unit 103 is configured to determine, based on the distribution model and an allowable interference upper limit of the particular node, an exclusion zone of the particular node which is represented by the number of nodes within the exclusion zone.

The first determination unit 101, the acquisition unit 102 and the second determination unit 103 may be implemented by one or more processing circuitry, and the processing circuitry may be implemented as a chip for example. The electronic apparatus 100 may, for example, be located at a spectrum management apparatus side, or may be communicatively connected to a spectrum management apparatus. The spectrum management apparatus may be implemented as a spectrum access system (SAS), a coexistence manager (CxM), a geographic location database (GLDB), a central controller and coordinator (C3) instance or the like, for example.

Figure 3:
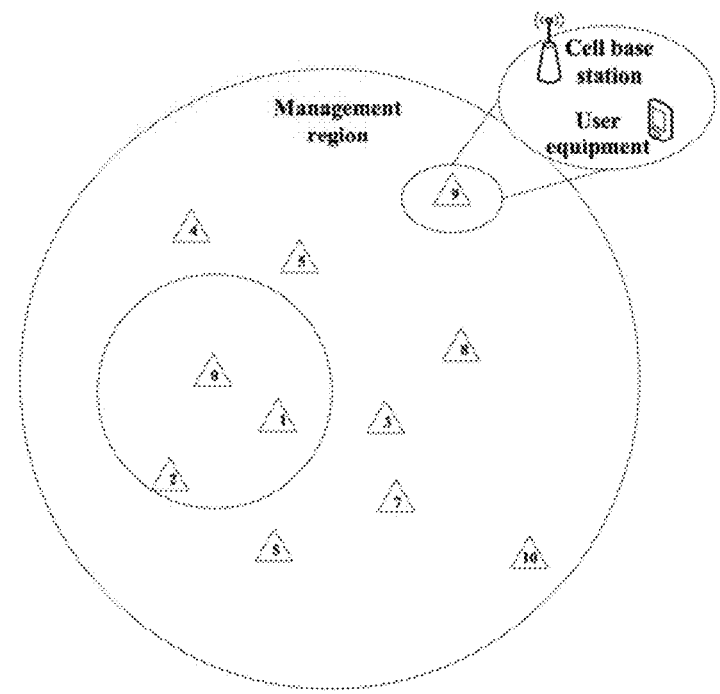
FIG. 3 shows a schematic example of a management region of a spectrum management apparatus.

FIG. 3 shows a schematic example of a management region of a spectrum management apparatus. Each communication system is shown by a triangle and is represented by a number in the triangle. Each communication system may be a serving cell consisting of a base station and user equipment (for example a communication system 9, which is shown in detail by ellipse at an upper-right corner), or may be a communication pair (D2D) consisting of multiple terminals. The communication systems may share a common frequency band, and may have different spectrum usage priority levels.

The node in the present disclosure may refer to a base station or use equipment in a communication system, or may refer to a base station and user equipment in the communication system.

FIG. 3 shows a schematic example of an exclusion zone of system 0 by taking the system 0 as an example. Systems 1 and 2 in the exclusion zone cannot use the same spectrum resource as the system 0 for communication.

In the embodiment, the exclusion zone is represented by discrete values, and is referred to as discrete exclusion zone (DEZ) hereinafter.

The first determination unit 101 determines a distribution status of nodes in the management region of the spectrum management apparatus. For example, the first determination unit 101 may determine the distribution status by accessing GLDB or based on related information of a primary system and a secondary system stored by the spectrum management apparatus. In an example, the distribution status of the nodes includes: a model of location distribution of nodes, a density of nodes and the number of nodes. For example, the model of location distribution of the nodes may be a Poisson distribution or other model.

For a particular node among nodes in the management region, for example a base station or user equipment in a primary system or a base station or user equipment in a secondary system with a high priority level, the acquisition unit 102 obtains a distribution model of accumulated interferences for the particular node subjected from other nodes based on the distribution status. For example, the distribution model may be expressed by a function.

In an example, the acquisition unit 102 calculates statistical parameters of the accumulated interferences based on the distribution status of nodes, and obtains the distribution model based on the statistical parameters. The statistical parameters of accumulated interferences each is a function of the exclusion zone.

For example, the statistical parameters of the accumulated interferences are a mean value and variance of the accumulated interferences. The acquisition unit 102 may obtain the distribution model by using a channel fading index and an emission power of the node.

In the following, a mean value and variance of the accumulated interferences for the particular node subjected from other nodes are calculated by assuming that the distribution of nodes follows the m-dimensional Poisson distribution. It should be understood that, this is only exemplary, and the distribution of nodes may follow other models. The acquisition unit 102 may perform similar calculation in a case of other models.

In this example, a boundary-free path loss model is used, and interferences for the particular node subjected from other nodes are decided by only path loss, as shown by the following equation (1).

$$I = \sum_{n=1}^{\infty} R_n^{-\alpha} \quad (1)$$

In which, n represents the n-th node among other nodes, $R_n$ represents a distance between the n-th node and the particular node, and a represents a channel fading index. The interferences for the particular node subjected from other nodes are a set of interferences for the particular node subjected from n nodes.

In a case that the discrete exclusion zone is represented by k, the accumulated interferences may be expressed as:

$$I_k = \sum_{n=k}^{\infty} R_n^{-\alpha} \quad (2)$$

It is known that for $n \in \Phi$ (in which, $\Phi$ represents a natural number set), and $R_n$ follows the generalized gamma distribution:

$$f_{R_n}(r) = e^{-\lambda c_m r^m} \frac{m(\lambda c_m r^m)^n}{r\Gamma(n)} \quad (3)$$

In which, $c_m r^m$ represents a volume of m-dimensional sphere whose radius is r, and $\lambda$, represents a density of the nodes.

Let $X_n = R_n^m$ and the distribution of $X_n$ may be obtained as the following equation (4):

$$f_{X_n}(x) = \lambda c_m e^{-\lambda c_m x} \frac{(\lambda c_m x)^{n-1}}{\Gamma(n)} \quad (4)$$

Let $$Y_n = R_n^{-\alpha} = X_n^{-\alpha/m}, \ I = \sum_{n=1}^{\infty} Y_n \text{ and } E(I) = \sum_{n=1}^{\infty} E(Y_n),$$

a mean value of $Y_n$ is expressed as follows:

$$E(Y_n) = \int_0^\infty x^{-\alpha/m} \lambda c_m e^{-\lambda c_m x} \frac{(\lambda c_m x)^{n-1}}{\Gamma(n)} dx \quad (5)$$

$$= \frac{(\lambda c_m)^n}{(n-1)!} \int_0^\infty x^{n-1-\alpha/m} e^{-\lambda c_m x} dx$$

$$= \frac{(\lambda c_m)^{\alpha/m}}{(n-1)!} \int_0^\infty (\lambda c_m x)^{n-1-\alpha/m} e^{-\lambda c_m x} d(\lambda c_m x)$$

The integration part in equation (5) is similar to definition of the gamma function, and only converges in a case that $n - 1 - \alpha/m > -1$, that is, $n > \alpha/m$. Since $\alpha/m > 1$, the nearest node (that is, a node of n=1) is necessary to be removed. In this case, the following equation (6) is obtained:

$$E\{Y_n\} = \frac{(\lambda c_m)^{\alpha/m}}{(n-1)!} \Gamma(n - \alpha/m) \quad (6)$$

Assuming k represents a value of a size of the exclusion zone and $k > \alpha/m > 1$, the accumulated interferences for the particular node from nodes outside the exclusion zone is limited, and can be calculated as follows:

$$E\{I_k\} = \sum_{n=k}^{N} E\{Y_n\} \quad (7)$$

$$= (\lambda c_m)^{\alpha/m} \sum_{n=k}^{N} \frac{\Gamma(n - \alpha/m)}{(n-1)!}$$

$$= (\lambda c_m)^\beta \sum_{n=k}^{N} \frac{(n-\beta)!}{(n-1)!}$$

$$= (\lambda c_m)^\beta \sum_{n=k}^{N} \frac{1}{(n-1) \cdots (n-\beta)}$$

$$= \frac{(\lambda c_m)^\beta}{\beta - 1} \sum_{n=k}^{N} \left( \frac{1}{(n-2) \cdots (n-\beta)} - \frac{1}{(n-1) \cdots (n-\beta+1)} \right)$$

$$= \frac{(\lambda c_m)^\beta}{\beta - 1} \left( \frac{1}{(k-2) \cdots (k-\beta)} - \frac{1}{(N-1) \cdots (N-\beta+1)} \right)$$

$$\lim_{N \to \infty} E\{I_k\} = \frac{(\lambda c_m)^\beta}{(\beta - 1)(k - 2) \cdots (k - \beta)} \quad (8)$$

In which, N represents the total number of nodes, $\beta = \alpha/m$, $C_m = \pi$, and an emission power of each node is assumed as 1.

In addition, the variance of the accumulated interferences is:

$$E\{I_k^2\} = E\left\{ \left( \sum_{n=k}^{N} Y_n \right)^2 \right\} \quad (9)$$

$$= \sum_{n=k}^{N} E\{Y_n^2\} + \sum_{i,j=k, i \neq j}^{N} E\{Y_i Y_j\}.$$

in which, $$\sum_{n=k}^{N} E\{Y_n^2\} = \sum_{n=k}^{N} \frac{(\lambda c_m)^{2\beta}}{(n-1)!} \Gamma(n - 2\beta) = \quad (10)$$

$$\frac{(\lambda c_m)^{2\beta}}{2\beta - 1} \left( \frac{1}{(k-2) \cdots (k-2\beta)} - \frac{1}{(N-1) \cdots (N-2\beta+1)} \right).$$

$$\lim_{N \to \infty} \sum_{n=k}^{N} E\{Y_n^2\} = \frac{(\lambda c_m)^{2\beta}}{(2\beta - 1)(k-2) \cdots (k-2\beta)}$$

$$\sum_{i,j=k, i \neq j}^{N} E\{Y_i Y_j\} = \quad (11)$$

$$\frac{(\lambda c_m)^{2\beta}}{(\beta - 1)^2} \left( \frac{1}{(k-2) \cdots (k-2\beta+1)} - \frac{1}{(N-2) \cdots (N-2\beta+1)} \right) -$$

$$\frac{2(\lambda c_m)^{2\beta}}{(N-\beta-1) \cdots (N-2\beta+1)(\beta-1)^2}$$

$$\left( \frac{1}{(k-2) \cdots (k-\beta)} - \frac{1}{(N-2) \cdots (N-\beta)} \right)$$

$$\lim_{N \to \infty} \sum_{i,j=k, i \neq j}^{N} E\{Y_i Y_j\} = \frac{(\lambda c_m)^{2\beta}}{(\beta-1)^2 (k-2) \cdots (k-2\beta+1)}$$

It may be seen that, the above mean value and variance both are functions of the exclusion zone k. According to the above equations (7) to (11), the mean value and variance of the accumulated interferences for the particular node subjected from nodes outside the exclusion zone in a case of arranging different exclusion zones may be calculated.

Figure 4:
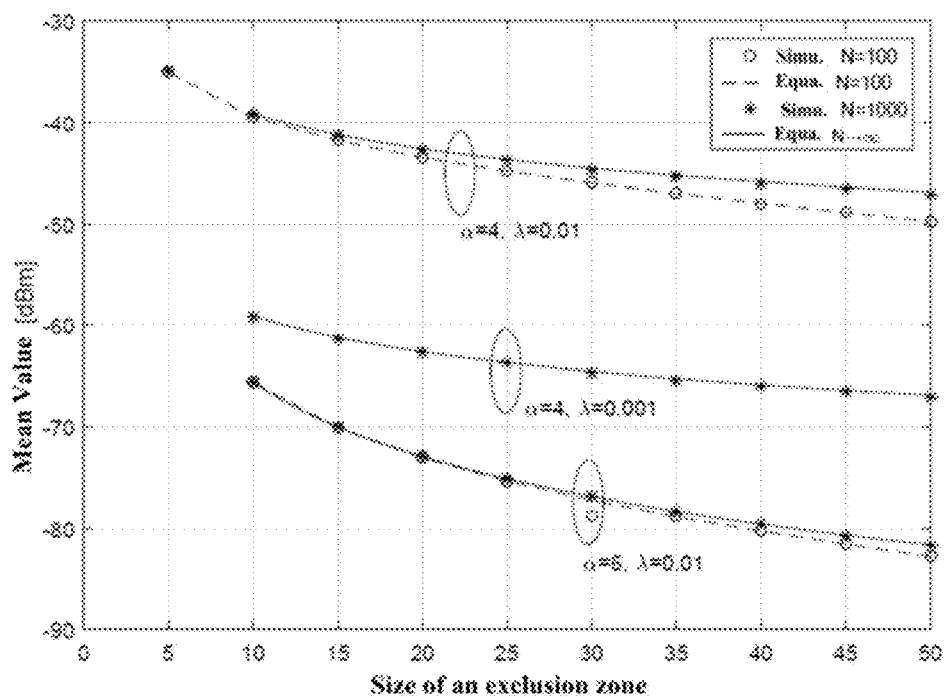
FIG. 4 shows a graph showing comparison between a mean value of accumulated interferences at a particular node obtained by simulation and a mean value of accumulated interferences at the particular node calculated according to equations of the present disclosure, in a case of different exclusion zones.
Figure 5:
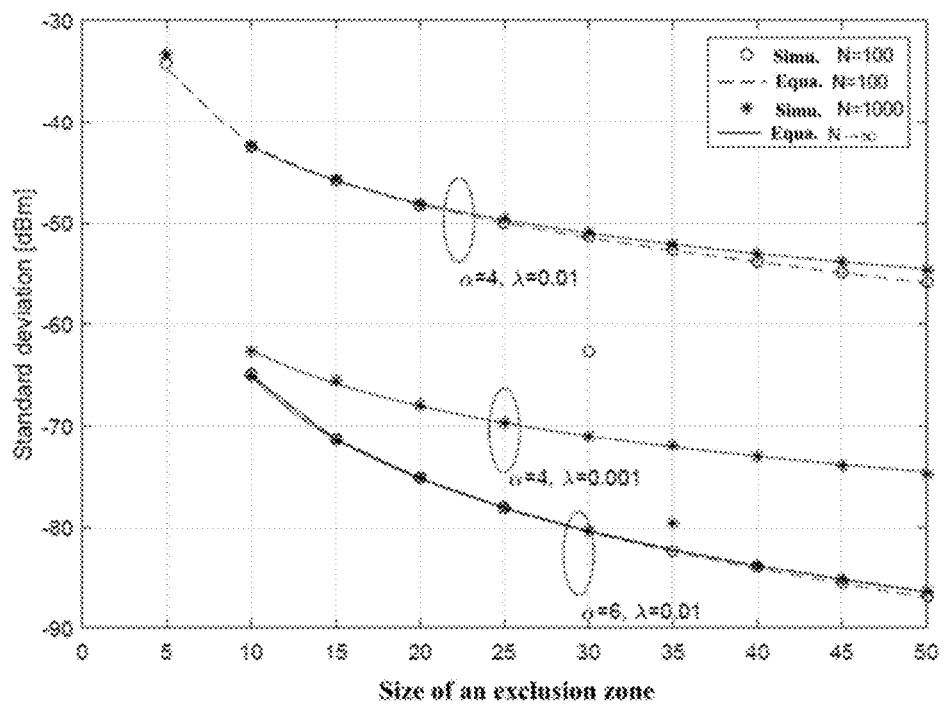
FIG. 5 shows a graph showing comparison between standard deviation (arithmetic square root of variance) of accumulated interferences at a particular node obtained by simulation and standard deviation of accumulated interferences at the particular node calculated according to equations of the present disclosure, in a case of different exclusion zones.

FIG. 4 shows a graph showing comparison between a mean value of the accumulated interferes for a particular node obtained by simulating and a mean value of the accumulated interferences calculated according to equation (7), in a case that different exclusion zones are arranged. Similarly, FIG. 5 shows a graph showing comparison between standard deviation (arithmetic square root of variance) of the accumulated interferes for a particular node obtained by simulating and standard deviation of the accumulated interferences calculated according to equation (9), in a case that different exclusion zones are arranged.

It may be seen that, the mean value and standard deviation of the accumulated interferences calculated according to equations of the present application are highly consistent with the results obtained by simulating, thereby further proving correctness of equations of the present application.

In an example, after obtaining the mean value and variance of the accumulated interferences, the acquisition unit 102 may, based on the mean value and variance, represent a characteristic function of the accumulated interferences, such as a probability density function (PDF) and/or a cumulative distribution function (CDF), by using a particular distribution such as Gaussian distribution or gamma distribution. It should be understood that, the Gaussian distribution and gamma distribution are only schematic, and other distributions with similar curve forms may be appropriately used.

Figure 6:
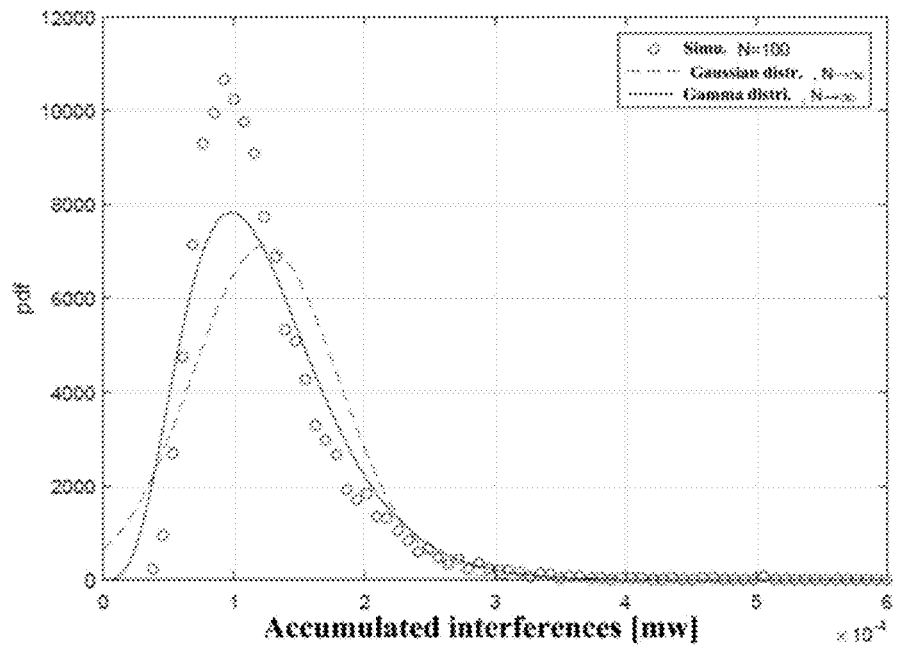
FIG. 6 shows an example of probability density function (PDF) of accumulated interferences.
Figure 7:
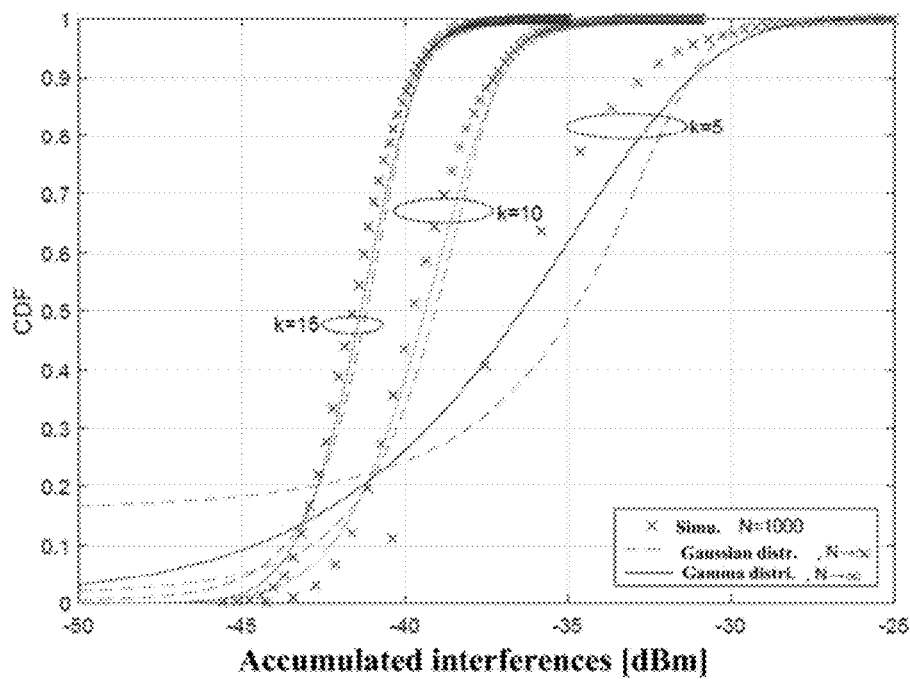
FIG. 7 shows an example of cumulative distribution function (CDF) of accumulated interferences.

FIG. 6 shows a graph of PDF of the accumulated interferences in a case of the exclusion zone k=10, N=100, α=4 and λ=0.01. In FIG. 6, circles represent a simulation result, a dotted line represents a result in a case of using the Gaussian distribution, and a solid line represents a result in a case of using the gamma distribution. FIG. 7 shows a graph of CDF of the accumulated interference in a case that the exclusion zones k are respectively 5, 10 and 15, N=100, α=4 and λ=0.01. In which x represents a simulation result, a dotted line represents a result in a case of using the Gaussian distribution, and a solid line represents a result of using the gamma distribution. It may be seen that, the distribution obtained by fitting based on the results of equations of the present application is highly consistent with the distribution obtained by simulation.

Further, the second determination unit 103 may determine an exclusion zone k based on the obtained distribution model and an allowable interference upper limit of the particular node. In the above example, the distribution model is represented by the obtained CDF for example. The second determination unit 103 determines k according to the CDF and a value of an allowable accumulated interference for the particular node, for example, determining k corresponding to a CDF curve for which a probability that the accumulated interferences reach the allowable interference upper limit exceeds a predetermined value, as the exclusion zone of the particular node.

It should be understood that, with the calculation method based on the distribution model according to the present application, not only a calculation load can be reduced, but also stability of the exclusion zone can be ensured, thereby ensuring spectrum utilization efficiency. In addition, it is ensured that nodes located at edges of the exclusion zone can use the spectrum resource. In other words, frequent spectrum switches do not occur even if the nodes move in a small range, thereby improving the communication quality.

Figure 8:
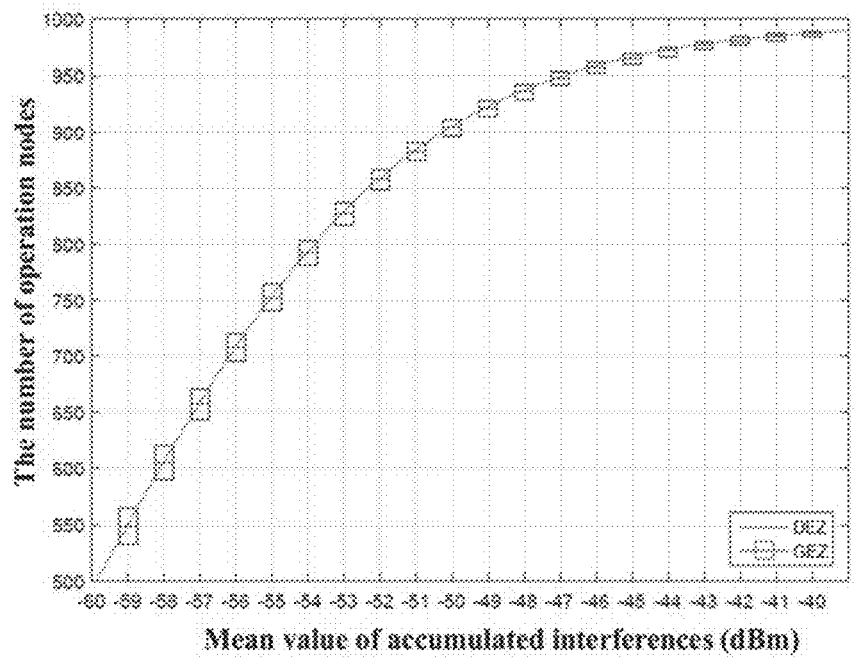
FIG. 8 shows the number of nodes outside an exclusion zone by using geographical location-based exclusion zone (GEZ) and a discrete exclusion zone (DEZ) according to the present disclosure, in a case that mean values of accumulated interferences for a particular node are the same.

FIG. 8 shows the number of nodes outside the exclusion zone in a case of using the existing geographical location-based exclusion zone (GEZ) and a discrete exclusion zone (DEZ) according to the present disclosure, in a case that mean values of accumulated interferences for the particular node are the same. It may be seen that, with the DEZ according to the present disclosure, the number of operation nodes outside the exclusion zone is fixed in a case that the mean value is unchanged. While with the existing GEZ, the number of operation nodes outside the exclusion zone fluctuates, resulting in system fluctuation.

Figure 9:
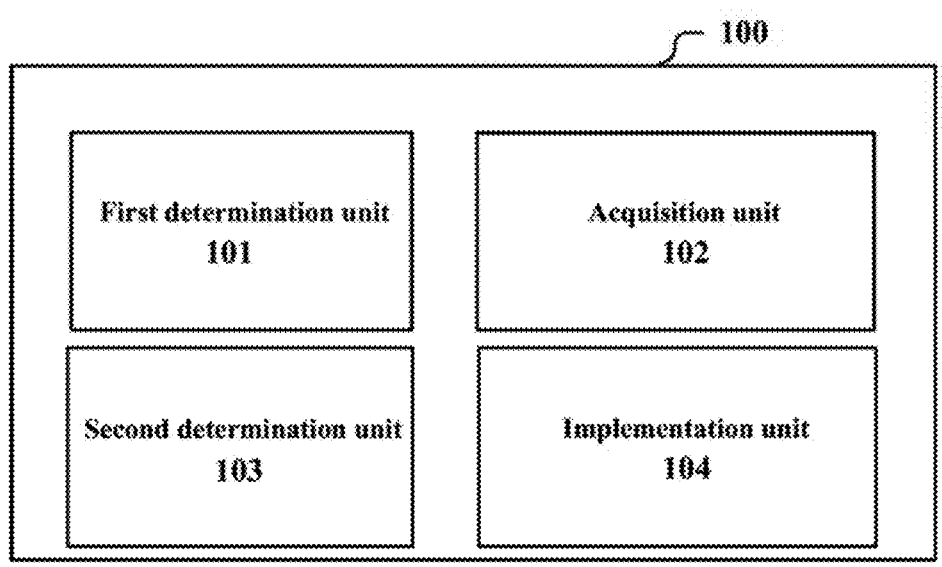
FIG. 9 shows a block diagram of functional modules of an electronic apparatus for wireless communications according to an embodiment of the present disclosure.

In addition, as shown in FIG. 9, the electronic device 100 may further include an implementation unit 104 configured to implement an exclusion zone, including: determining neighboring relationship between nodes by ranking neighboring nodes of a particular node in an order from near to far, and allocating spectrum resources for the neighboring nodes in the exclusion zone based on the neighboring relationship, which are different from spectrum resources for the particular node.

The implementation unit 104 may be implemented by one or more processing circuitry, and the processing circuitry may be implemented as a chip for example.

In a case that the second determination unit 103 determines the exclusion zone, the implementation unit 104 is configured to determine nodes located in the exclusion zone and thus allocate, for these nodes, spectrum resources different from the spectrum resources for the particular node. Since the nodes in the exclusion zone is near the particular node, only neighboring nodes of the particular node may be considered. The neighboring node may be, for example, defined as a node of which a distance to the particular node is within a predetermined range, or a node of which signal strength detected by the particular node falls within a predetermined range. By ranking the neighboring nodes in an order from near to far, a neighboring relationship between the particular node and all nodes in a set of neighboring nodes may be determined, that is, for any one node, determining which node(s) is adjacent thereto. For example, in a case that the particular node is 0, its neighboring nodes are 1, 2, 3, 4, . . . in an order from near to far, as shown in FIG. 3. In this case, it is considered that node 0 is adjacent to node 1, node 1 is adjacent to node 1 and node 2, and so on.

In an example, the implementation unit 104 is configured to rank according to a relative location relationship between the neighboring nodes and the particular node. Since geographical location information of each node is known, the relative location relationship between the neighboring node and the particular node, for example a distance between the neighboring node and the particular node, can be obtained, thereby performing ranking.

In another example, the implementation unit 104 is configured to rank based on signal strength received by the neighboring nodes from the particular node. Specifically, after the spectrum usage of the particular node is determined, the neighboring nodes may be instructed to detect strength of a signal emitted by the particular node, and then report measurement results. The implementation unit 104 performs ranking according to the measurement results.

In addition, the implementation unit 104 may be configured to re-allocate, in a case that the neighboring relationship changes, spectrum resources for the nodes based on the changed neighboring relationship. In other words, if the neighboring relationship keeps unchanged, the current spectrum allocation configuration may be used continuously.

For example, in a case that ranking is performed based on the relative location relationship between the neighboring nodes and the particular node, the relative location relationship may be represented by a relative speed between nodes if nodes hardly move relative to each other, for example a platoon scenario. In a case that a relative speed of a certain node relative to the particular node or other node changes, the relative location relationship may change. The implementation unit 104 may calculate a relative speed between nodes based on a moving direction and a moving speed of respective nodes, or acquire, from a node, a relative speed of the node relative to another node. In this case, it can be determined whether the neighboring relationship would change in conjunction with a distance between nodes, and a time instant when the neighboring relationship changes can be prejudged. In this case, the implementation unit 104 may determine a period at which the neighboring relationship changes according to the relative speed and the density of nodes, and allocates the spectrum periodically. Specifically, the distance between neighboring nodes may be calculated based on the density of nodes, and the period at which the neighboring relationship changes may be obtained by dividing the distance by the relative speed.

Figure 10:
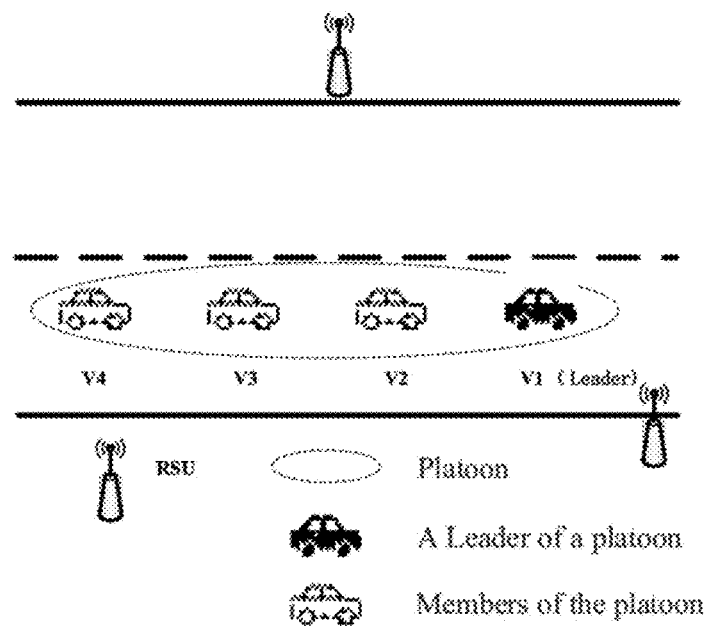
FIG. 10 shows a schematic diagram of a scenario of a platoon.

In an application example, the particular node may be a leader of the platoon, and other nodes may be members of the platoon. FIG. 10 shows a scenario of the platoon, V1 is a platoon manager, and V2 and V4 are platoon members. V1 and V2 are nodes to be protected, that is, the particular node described above, and exclusion zones are required to be arranged for V1 and V2. A size of the exclusion zone calculated based on the distribution model is 1, that is, spectrum resources of V1 (or V2) may be multiplexed starting from the second neighboring node.

Figure 11:
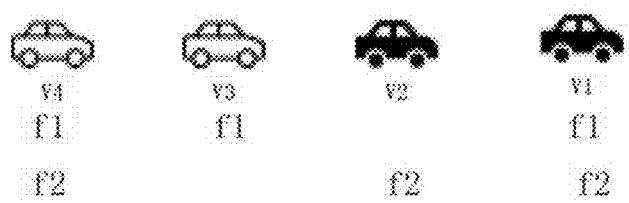
FIG. 11 shows neighboring relationship between vehicles.

FIG. 11 shows a neighboring relationship between vehicles. Vehicle V1 has a neighboring relationship with V2, V3 and V4, and a first neighboring node V2 cannot use a frequency band f1 used by V1. Vehicle V2 has a neighboring relationship with V3, V1 and V4, and vehicle V3 cannot use a frequency band f2 used by V2.

It should be understood that, this is only an application example, and the application of the present disclosure is not limited thereto.

In addition, the implementation unit 104 may be further configured to set a spectrum sensing threshold lower than a predetermined threshold for nodes in the exclusion zone. In this way, the nodes in the exclusion zone detect that the spectrum is always occupied when performing spectrum sensing, and thus the nodes in the exclusion zone automatically stop using the spectrum when the particular node uses the spectrum resources, thereby reducing unnecessary system overhead. Alternatively, the electronic device 100 may send an instruction for stopping using spectrum to the nodes in the exclusion zone.

In another example, the acquisition unit 102 is further configured to acquire aggregated interferences produced by free nodes not managed by the present spectrum management apparatus to the particular node. The second determination unit 103 is configured to remove the aggregated interferences from the allowable interference upper limit of the particular node to obtain an actual allowable interference upper limit of the particular node, and determine the exclusion zone based on the actual allowable interference upper limit and the distribution model. It should be understood that, the free nodes described herein may be managed by other spectrum management apparatus.

In a management region of the present spectrum management apparatus, there may be a node managed by other spectrum management apparatus, and the node is free relative to the present spectrum management apparatus. However, in a case that the free node uses the same spectrum resources as the particular node, interferences are also produced to the particular node and this part of interferences are not reflected in the above distribution model. Therefore, it is required to remove this part of interferences from the allowable interference upper limit, thereby ensuring accuracy of the calculated exclusion zone.

For example, the acquisition unit 102 may calculate the aggregated interferences produced by the free nodes to the particular node, based on a location distribution of the free nodes, the density of free nodes, the number of free nodes, and spectrum usage information of the free nodes.

The acquiring unit 102 may acquire relative information of the free nodes from a second spectrum management apparatus managing the free nodes, including but not limited to a location distribution of the free nodes, the density of free nodes, the number of free nodes, and spectrum usage information of the free nodes. Alternatively, the acquiring unit 102 may acquire the related information of the free nodes from the node managed by the present spectrum management apparatus. The related information of the free nodes is provided to the node managed by the present spectrum management apparatus via the second spectrum management apparatus managing the free nodes.

In a case of considering system architecture based on GLDB, for example in the system architecture using a TV frequency band or 3.5 GHz frequency band, there are two levels of spectrum management apparatus. A first level spectrum management apparatus is GLDB configured to calculate interferences for a primary system, and a second level spectrum management apparatus is a coexistence management apparatus (for example CxM). Some secondary systems may select to connect to the second level spectrum management apparatus to become managed secondary systems. Some secondary systems start to use a frequency band after acquiring available spectrum resources from the first level spectrum management apparatus while not connecting to the second level spectrum management apparatus. The secondary systems are unmanaged secondary systems, and their base station or user equipment is the free node in the present disclosure. In addition, in a case that there are multiple second level spectrum management apparatus, for a certain second level spectrum management apparatus, secondary systems of other spectrum management apparatus are also unmanaged secondary systems.

Figure 12:
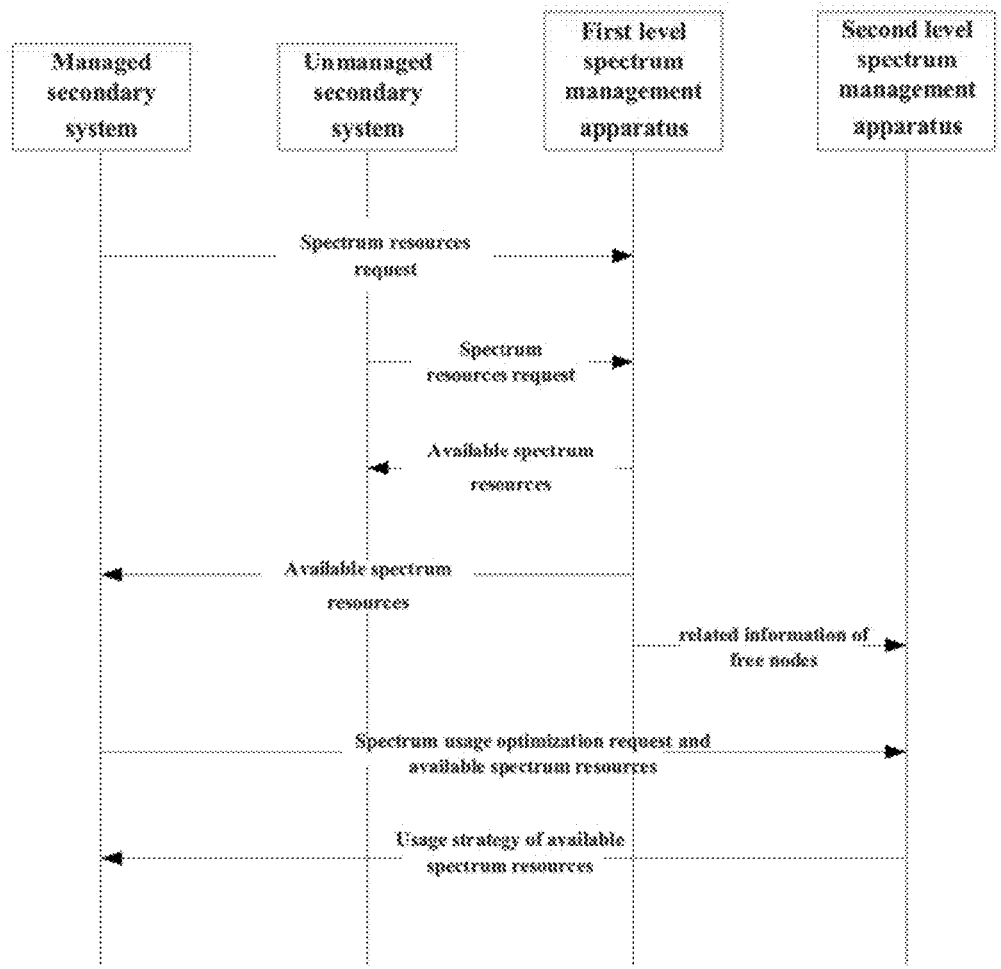
FIG. 12 shows an information flowchart of an example in which a first level spectrum management device provides related information of free nodes to a second level spectrum management device.

FIG. 12 shows an information flowchart of an example in which the first level spectrum management apparatus provides related information of the free nodes to the second level spectrum management apparatus. Both the managed secondary system and the unmanaged secondary system send a spectrum resource request to the first level spectrum management apparatus. The first level spectrum management apparatus informs the managed secondary system and the unmanaged secondary system of available spectrum resources, and provides related information of the unmanaged secondary system to the second level spectrum management apparatus. Subsequently, the unmanaged secondary system performs communications by using the acquired available spectrum resources. The managed secondary system sends information on the obtained available spectrum resources and the spectrum usage optimization request to the second level spectrum management apparatus managing it, and the second level spectrum management apparatus sends an established strategy for using the available spectrum resources to the managed secondary systems.

Figure 13:
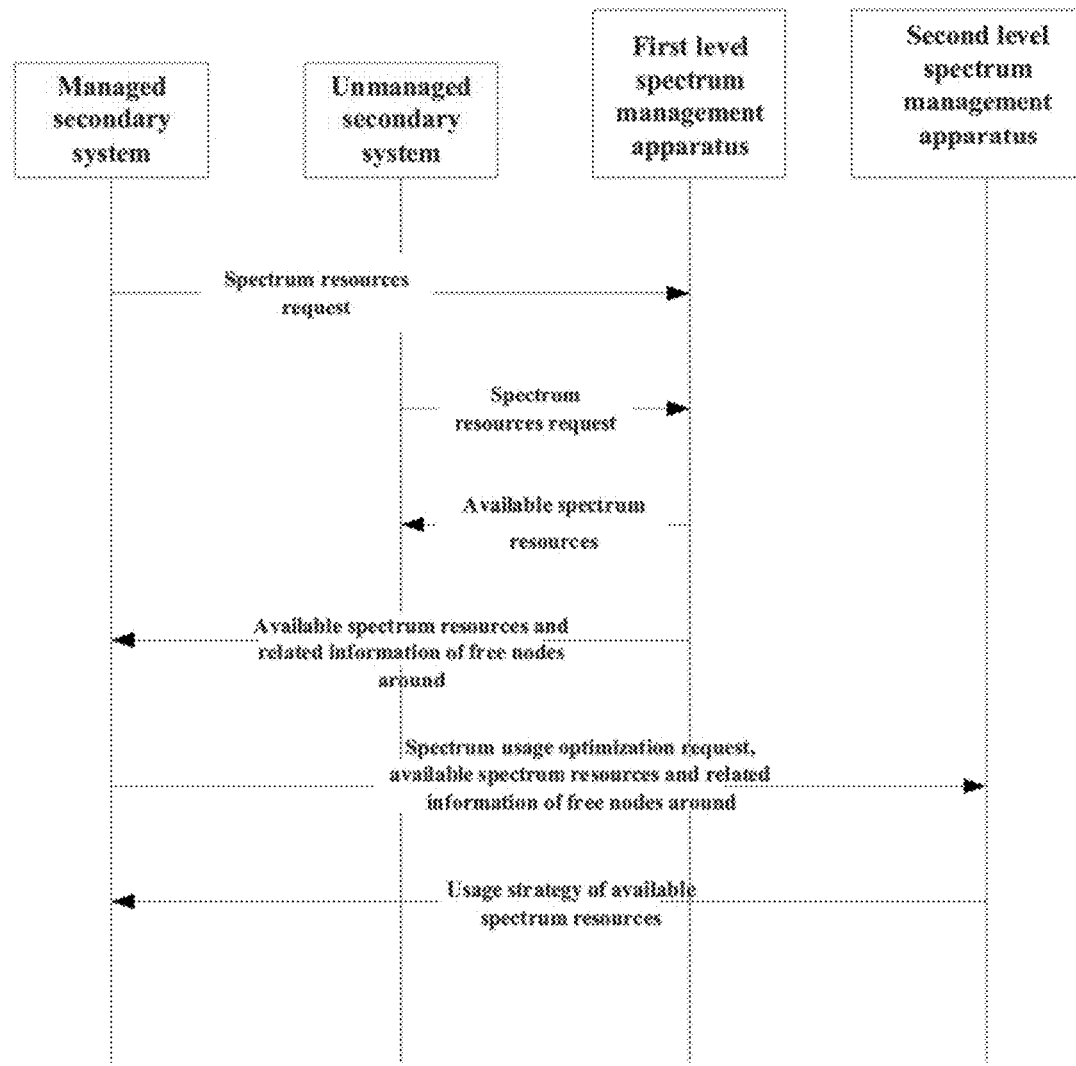
FIG. 13 shows an information flowchart in which related information of free nodes is transmitted via a managed secondary system.

FIG. 13 shows an information flowchart in which related information of a free node is transmitted via the managed secondary system. Similar to FIG. 12, both the managed secondary system and the unmanaged second system send a spectrum resource request to the first level spectrum management apparatus, and the first level spectrum management apparatus informs the managed secondary system and the unmanaged secondary system of available spectrum resources. Different from FIG. 12, in FIG. 13, the first level spectrum management apparatus also informs the managed secondary system of related information of free nodes around the managed secondary system. Subsequently, the managed secondary system sends the obtained related information of the free nodes around to the second level spectrum management apparatus.

As described above, the exclusion zone for the particular node can be determined more accurately in consideration of the aggregated interferences of the free nodes, thereby improving the communication quality.

Second Embodiment

Figure 14:
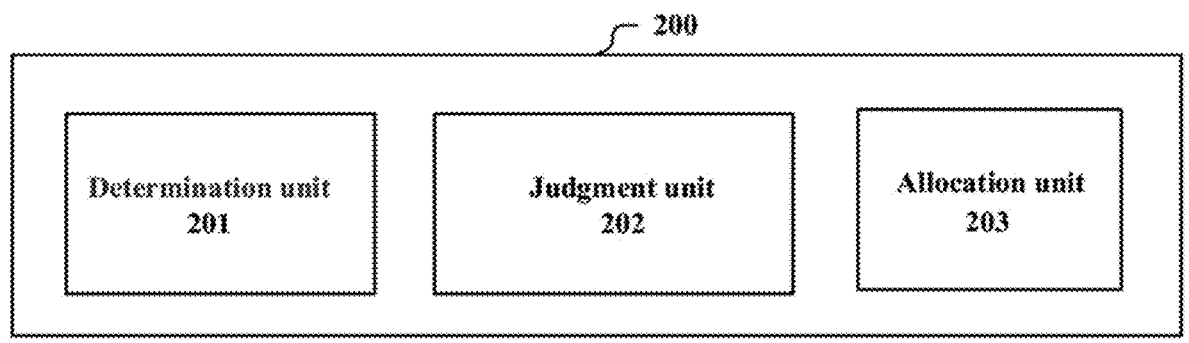
FIG. 14 shows a block diagram of functional modules of an electronic apparatus for wireless communications according to an embodiment of the present disclosure.

FIG. 14 shows a block diagram of functional modules of an electronic apparatus 200 for wireless communications according to another embodiment of the present disclosure. As shown in FIG. 14, the electronic apparatus 200 includes a determination unit 201, a judgment unit 202 and an allocation unit 203. The determination unit 201 is configured to determine, by ranking neighboring nodes of each node in an order from near to far, a neighboring relationship among nodes. The judgment unit 202 is configured to judge whether the neighboring relationship changes. The allocation unit 203 is configured to reallocate, in a case that the neighboring relationship changes, spectrum resources for nodes based on the changed neighboring relationship.

The determination unit 201, the judgment unit 202 and the allocation unit 203 may be implemented by one or more processing circuitry, and the processing circuitry may be implemented as a chip for example. The electronic apparatus 200 may be located at a spectrum management apparatus side or may be communicatively connected to the spectrum management apparatus. In addition, the electronic device 200 may be located at a node side, for example at a manager side of a platoon.

With the electronic apparatus 100, spectrum allocation may be performed based on only the neighboring relationship between nodes, thereby reducing system overhead. If the neighboring relationship between nodes keeps unchanged, the previous spectrum allocation scheme may be used continuously, without necessity of reallocating the spectrum resources.

For example, the determination unit 201 may rank according to a relative location relationship between nodes. Alternatively, the determination unit 201 may rank based on signal strength received by neighboring nodes from a node.

In an example, the relative location relationship may be represented by a relative speed between nodes. For example, the determination unit 201 may calculate a relative speed between nodes based on a moving direction and a moving speed of each node, or acquire, from a node, a relative speed of the node relative to another node. Related details are described in detail in the first embodiment, and are not repeated here.

In addition, the determination unit 201 may determine a period at which the neighboring relationship changes according to the relative speed and a density of the nodes, and the judgment unit 202 performs judgment at the period. Specifically, a distance between neighboring nodes may be calculated based on the density of the nodes, and the period at which the neighboring relationship changes may be obtained by dividing the distance by the relative speed. In this way, change of the neighboring relationship may be periodically monitored rather than monitored in a real-time manner, thereby further reducing the system overhead.

In an application example, one of the nodes is a leader of a platoon, and other nodes are members of the platoon.

The allocation unit 203 may be configured to reallocate spectrum resources for only nodes involved in a change in a case that the neighboring relationship changes, thereby ensuring both stability of spectrum usage and the spectrum usage efficiency.

In addition, the determination unit 201 may be further configured to set a spectrum sensing threshold for each node based on the neighboring relationship. For example, the determination unit 201 may set a spectrum sensing threshold lower than a predetermined threshold for first N neighboring nodes of a particular node, where N is a positive integer. For example, for a particular node for which a discrete exclusion zone with a size of N is arranged, a spectrum sensing threshold of first N neighboring nodes of the particular node may be set to be lower than a predetermined threshold, so that the first N neighboring nodes automatically stop using the spectrum.

Third Embodiment

In the process of describing the electronic apparatus for wireless communications in the embodiments described above, obviously, some processing and methods are also disclosed. Hereinafter, an overview of the methods is given without repeating some details disclosed above. However, it should be noted that, although the methods are disclosed in a process of describing the electronic apparatus for wireless communications, the methods do not certainly employ or are not certainly executed by the aforementioned components. For example, the embodiments of the electronic apparatus for wireless communications may be partially or completely implemented with hardware and/or firmware, the method described below may be executed by a computer-executable program completely, although the hardware and/or firmware of the electronic apparatus for wireless communications can also be used in the methods.

Figure 15:
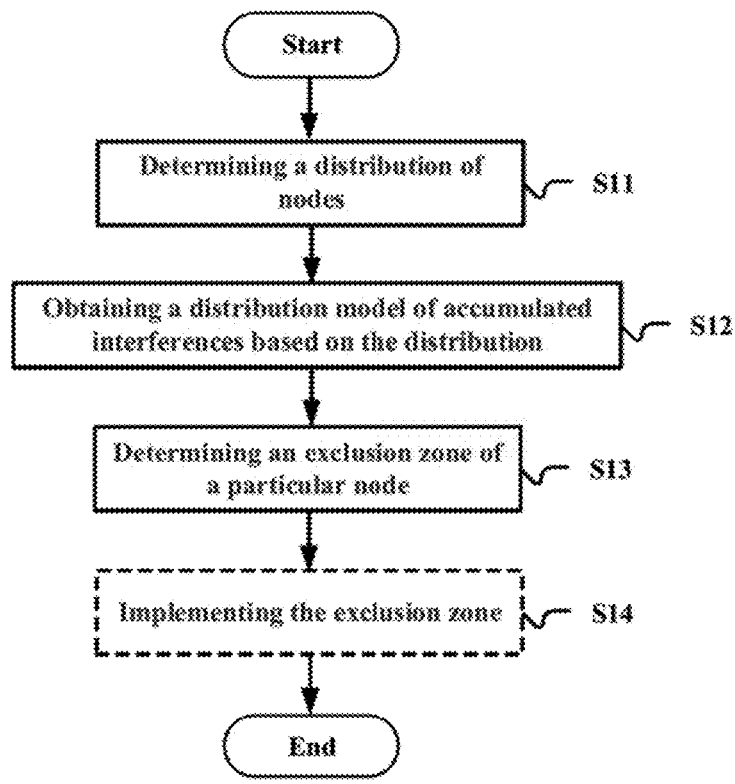
FIG. 15 shows a flowchart of a method for wireless communications according to an embodiment of the present disclosure.

FIG. 15 shows a flowchart of a method for wireless communications according to an embodiment of the present disclosure. The method includes: determining a distribution status of nodes in a management region of a spectrum management apparatus (S11); obtaining a distribution model of accumulated interferences for a particular node among the nodes subjected from other nodes among the nodes based on the distribution status (S12); and determining an exclusion zone of the particular node based on the distribution model and an allowable interference upper limit of the particular node, where the exclusion zone is represented by the number of nodes in the exclusion zone (S13).

For example, the distribution status of the nodes includes one or more of the following: a model of location distribution of nodes, a density of nodes, and the number of nodes.

In step S12, statistical parameters of accumulated interferences can be calculated based on the distribution of nodes, and a distribution model is obtained based on the statistical parameters. The statistical parameters of the accumulated interference each are a function of the exclusion zone. For example, the statistical parameters of the accumulated interferences include a mean value and variance of the accumulated interferences. In addition, in step S12, the distribution model may be obtained based on a channel fading index and an emission power of the node.

In an example, in step S12, aggregated interferences produced to the particular node by free nodes not managed by the present spectrum management apparatus may be obtained; and in step S13, an actual allowable interference upper limit for the particular node is obtained by removing the aggregated interferences from the allowable interference upper limit for the particular node, and the exclusion zone is determined based on the actual allowable interference upper limit and the distribution model.

For example, the aggregated interferences produced to the particular node by the free nodes may be calculated based on the location distribution of the free nodes, the density of the free nodes, the number of the free nodes, and spectrum usage information of the free nodes. Related information of the free nodes may be acquired from a second spectrum management apparatus managing the free nodes. Alternatively, the related information of the free nodes may be acquired from a node managed by the present spectrum management apparatus. The related information of the free nodes is provided to the node managed by the present spectrum management apparatus by the second spectrum management apparatus managing the free nodes.

In addition, as shown by a dashed line block in FIG. 15, the method may further include a step S14: implementing the exclusion zone. The process of implementing the exclusion zone includes: determining a neighboring relationship between nodes by ranking neighboring nodes of the particular node in an order from near to far, and allocating spectrum resources for neighboring nodes in the exclusion zone based on the neighboring relationship, which are different from spectrum resources for the particular node.

For example, in a case that the neighboring relationship changes, spectrum resources are reallocated for the nodes based on the changed neighboring relationship.

In step S14, ranking can be performed based on a relative location relationship between the neighboring nodes and the particular node. The ranking may also be performed based on signal strength received by the neighboring nodes from the particular node. For example, the relative location relationship may be represented by a relative speed between nodes. The relative speed between nodes may be calculated based on a moving direction and a moving speed of respective nodes, or it is possible to acquire, from a node, a relative speed of the node relative to another node.

In addition, a period at which the neighboring relationship changes may be determined according to the relative speed and the density of nodes.

In an application example, the particular node is a manager of a platoon, and other nodes are members of the platoon.

In addition, a spectrum sensing threshold lower than a predetermined threshold may be set for nodes in the exclusion zone.

Figure 16:
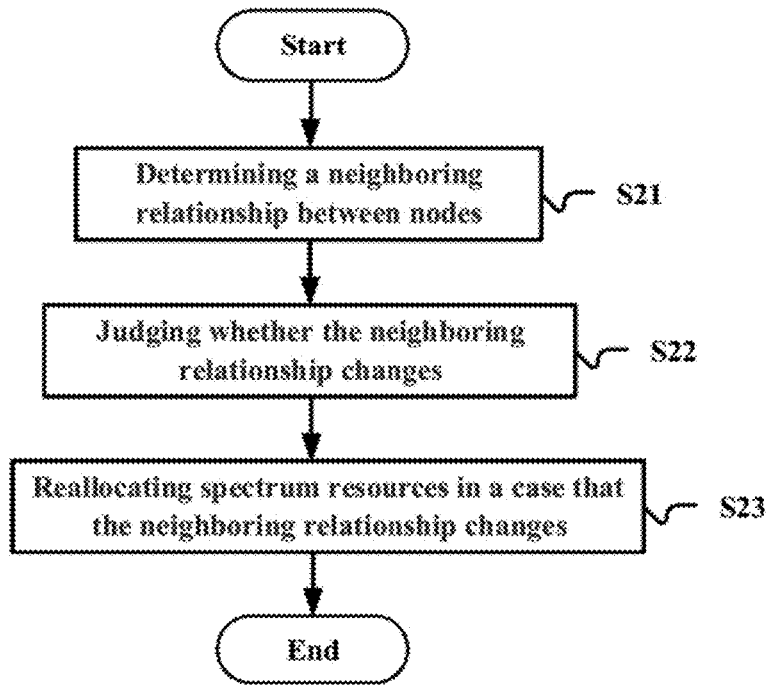
FIG. 16 shows a flowchart of a method for wireless communications according to an embodiment of the present disclosure.

FIG. 16 shows a flowchart of a method for wireless communications according to another embodiment of the present disclosure. The method includes: determining a neighboring relationship between nodes by ranking neighboring nodes of each node in an order from near to far (S21); determining whether the neighboring relationship changes (S22); and in a case that the neighboring relationship changes, reallocating spectrum resources for the nodes based on the changed neighboring relationship (S23).

It should be noted that, the above methods may be used in combination or separately. Details are described in detail in the first and second embodiments, and are not repeated herein.

The technology of the present disclosure may be applied to various products. For example, the electronic device 100 or 200 may be implemented as any type of server, such as a tower type server, a rack type server and a blade type server. The electronic device 100 or 200 may be a control module (such as an integrated circuit module including a single die, and a card or blade inserted into a slot of the blade type server) mounted on a server.

Application Example of a Server

Figure 17:
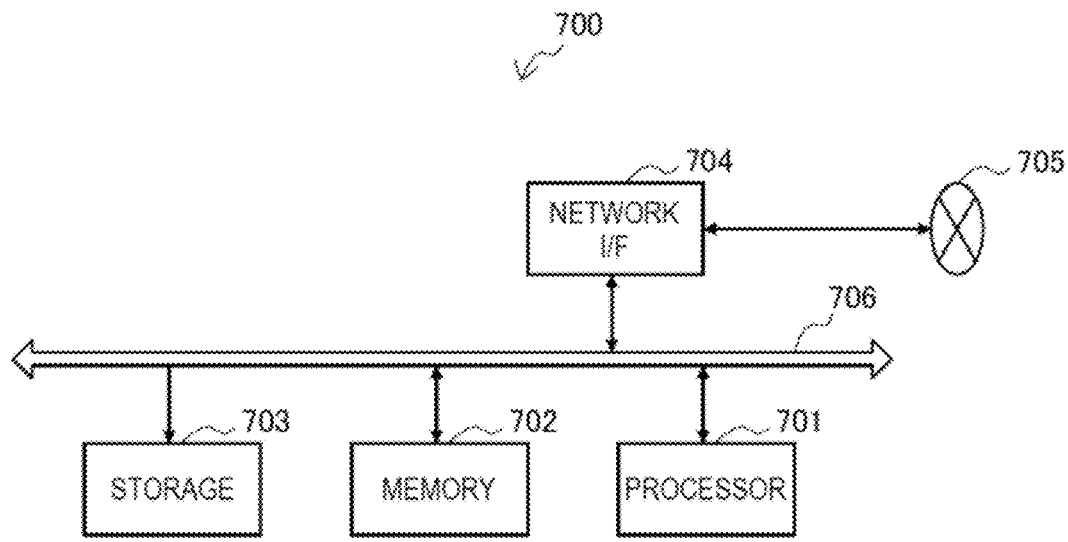
FIG. 17 is a block diagram showing an example of a schematic configuration of a server 700 to which the technology of the present disclosure may be applied.

FIG. 17 shows a block diagram of an example of a schematic configuration of a server 700 to which the technology of the present disclosure may be applied. The server 700 includes a processor 701, a memory 702, a storage 703, a network interface 704, and a bus 706

The processor 701 may be, for example, a central processing unit (CPU) or a digital signal processor (DSP), and controls functions of the server 700. The memory 702 includes random access memory (RAM) and read only memory (ROM), and stores a program that is executed by the processor 701 and data. The storage 703 may include a storage medium such as a semiconductor memory and a hard disk.

The network interface 704 is a wired communication interface for connecting the server 700 to a wired communication network 705. The wired communication network 705 may be a core network such as an Evolved Packet Core (EPC), or a packet data network (PDN) such as the Internet.

The bus 706 connects the processor 701, the memory 702, the storage 703, and the network interface 704 to each other. The bus 706 may include two or more buses (such as a high speed bus and a low speed bus) each of which has different speed.

In the server 700 shown in FIG. 17, the first determination unit 101, the acquisition unit 102 and the second determination unit 103 described with reference to FIG. 2, the implementation unit 104 described with reference to FIG. 9, and the determination unit 201, the judgment unit 202 and the allocation unit 203 described with reference to FIG. 14 may be implemented by the processor 701. For example, the processor 701 may determine the discrete exclusion zone of the particular node by executing functions of the first determination unit 101, the acquisition unit 102 and the second determination unit 103, and achieve spectrum allocation based on the neighboring relationship by executing functions of the determination unit 201, the judgment unit 202 and the allocation unit 203.

In addition, the electronic device 200 may be implemented as various base stations or user equipment.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 1800 shown in FIG. 18) from a storage medium or network, where the computer is capable of implementing various functions when installed with various programs.

Figure 18:
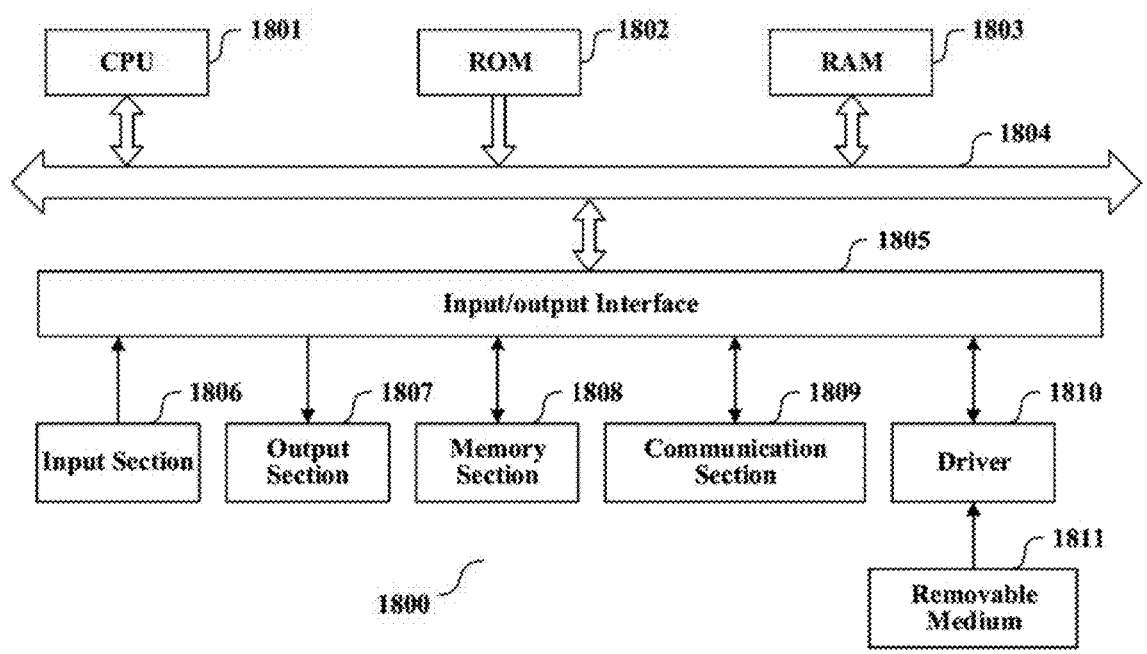
FIG. 18 is a block diagram of an exemplary block diagram illustrating the structure of a general purpose personal computer capable of realizing the method and/or device and/or system according to the embodiments of the present disclosure.

In FIG. 18, a central processing unit (CPU) 1801 executes various processing according to a program stored in a read-only memory (ROM) 1802 or a program loaded to a random access memory (RAM) 1803 from a memory section 1808. The data needed for the various processing of the CPU 1801 may be stored in the RAM 1803 as needed. The CPU 1801, the ROM 1802 and the RAM 1803 are linked with each other via a bus 1804. An input/output interface 1805 is also linked to the bus 1804.

The following components are linked to the input/output interface 1805: an input section 1806 (including keyboard, mouse and the like), an output section 1807 (including displays such as a cathode ray tube (CRT), a liquid crystal display (LCD), a loudspeaker and the like), a memory section 1808 (including hard disc and the like), and a communication section 1809 (including a network interface card such as a LAN card, modem and the like). The communication section 1809 performs communication processing via a network such as the Internet. A driver 1810 may also be linked to the input/output interface 1805, if needed. If needed, a removable medium 1811, for example, a magnetic disc, an optical disc, a magnetic optical disc, a semiconductor memory and the like, may be installed in the driver 1810, so that the computer program read therefrom is installed in the memory section 1808 as appropriate.

In the case where the foregoing series of processing is achieved through software, programs forming the software are installed from a network such as the Internet or a memory medium such as the removable medium 1811.

It should be appreciated by those skilled in the art that the memory medium is not limited to the removable medium 1811 shown in FIG. 18, which has program stored therein and is distributed separately from the apparatus so as to provide the programs to users. The removable medium 1811 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1802 and the memory section 1808 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n)" in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the essence and scope of the present disclosure. Therefore, the scope of the present disclosure is defined merely by the appended claims and their equivalents.

The invention claimed is:

1. An electronic apparatus for wireless communications, comprising:
    processing circuitry, configured to:
    determine a distribution status of nodes within a management region of a spectrum management apparatus;
    acquire, based on the distribution status, a distribution model of accumulated interferences for a particular node among the nodes subjected from other nodes among the nodes;
    determine, based on the distribution model and an allowable interference upper limit of the particular node, an exclusion zone of the particular node which is represented by the number of nodes within the exclusion zone;
    acquire aggregated interferences produced by free nodes not managed by the present spectrum management apparatus to the particular node;
    remove the aggregated interferences from an allowable interference upper limit of the particular node to acquire an actual allowable interference upper limit of the particular node; and
    determine, based on the actual allowable interference upper limit and the distribution model, the exclusion zone.

2. The electronic apparatus according to claim 1, wherein, the distribution status of the nodes comprises one or more of the following: a model of a location distribution of the nodes; a density of the nodes; and the number of the nodes.

3. The electronic apparatus according to claim 1, wherein, the processing circuitry is further configured to rank neighboring nodes of the particular node in an order from near to far, to determine neighboring relationships among nodes, or
    wherein, the processing circuitry is configured to perform the ranking according to relative location relationships between the neighboring nodes and the particular node, or
    wherein, the processing circuitry is configured to perform the ranking based on signal strength received by the neighboring nodes from the particular node.

4. The electronic apparatus according to claim 3, wherein, the relative location relationship is represented by a relative speed between nodes.

5. The electronic apparatus according to claim 4, wherein, the processing circuitry is configured to calculate the relative speed between the nodes based on moving directions and moving speeds of respective nodes, or acquire, from a node, the relative speed of the node with respect to another node.

6. The electronic apparatus according to claim 4, wherein, the processing circuitry is further configured to determine, based on the relative speed and a density of the nodes, a period at which the neighboring relationship changes.

7. The electronic apparatus according to claim 3, wherein, the processing circuitry is further configured to implement the exclusion zone by allocating, based on the neighboring relationship, spectrum resources for the neighboring nodes within the exclusion zone which are different from the spectrum resources allocated for the particular node; and re-allocate, in a case that the neighboring relationship changes, the spectrum resources for the nodes based on changed neighboring relationship.

8. The electronic apparatus according to claim 1, wherein, the processing circuitry is configured to calculate statistical parameters for the accumulated interferences based on the distribution of the nodes, and acquire the distribution model based on the statistical parameters, wherein the statistical parameters for the accumulated interferences each is a function of the exclusion zone.

9. The electronic apparatus according to claim 1, wherein, the processing circuitry is further configured to acquire the distribution model based on a channel fading index and an emission power of the nodes.

10. The electronic apparatus according to claim 1, wherein, the processing circuitry is configured to calculate, based on a location distribution of the free nodes, a density of the free nodes, the number of the free nodes, and spectrum utilization information of the free nodes, the aggregated interferences by the free nodes producing to the particular node.

11. The electronic apparatus according to claim 1, wherein, the processing circuitry is configured to acquire, from a second spectrum management apparatus managing the free nodes, information related to the free nodes, or
wherein, the processing circuitry is configured to acquire, from a node managed by the present spectrum management apparatus, information related to the free nodes, wherein, the information related to the free nodes is provided to the node managed by the present spectrum management apparatus by a second spectrum management apparatus managing the free nodes.

12. An electronic apparatus for wireless communications, comprising:
processing circuitry, configured to:
determine, by ranking neighboring nodes of each node in an order from near to far, neighboring relationship between nodes;
judge whether the neighboring relationship changes; and
in a case that the neighboring relationship changes, re-allocate spectrum resources for the nodes based on changed neighboring relationship; and
re-allocate, in a case of the neighboring relationship changing, spectrum resources only for nodes involved in the changing.

13. The electronic apparatus according to claim 12, wherein, the processing circuitry is configured to perform the ranking based on relative location relationship between nodes, or
wherein, the processing circuitry is configured to perform the ranking based on signal strength received by the neighboring nodes from the node.

14. The electronic apparatus according to claim 13, wherein, the relative location relationship is represented by a relative speed between nodes.

15. The electronic apparatus according to claim 14, wherein, the processing circuitry is configured to calculate, based on moving directions and moving speeds of respective nodes, the relative speed between the nodes, or acquire, from a node, the relative speed of the node with respect to another node.

16. The electronic apparatus according to claim 14, wherein, the processing circuitry is further configured to determine, based on the relative speed and a density of the nodes, a period at which the neighboring relationship changes, and perform the judging at the period.

17. The electronic apparatus according to claim 12, wherein, the processing circuitry is further configured to set a spectrum sensing threshold for each node based on the neighboring relationship.

18. A method for wireless communications, comprising:
determining a distribution of nodes within a management region of a spectrum management apparatus;
acquiring, based on the distribution, a distribution model of accumulated interferences for a particular node among the nodes subjected from other nodes among the nodes;
determining, based on the distribution model and an allowable interference upper limit of the particular node, an exclusion zone of the particular node which is represented by the number of nodes within the exclusion zone;
acquiring aggregated interferences produced by free nodes not managed by the present spectrum management apparatus to the particular node:
removing the aggregated interferences from an allowable interference upper limit of the particular node to acquire an actual allowable interference upper limit of the particular node; and
determining based on the actual allowable interference upper limit and the distribution model, the exclusion zone.

* * * * *